Feb. 3, 1970   R. W. ANTHONY   3,492,914
EXPANDING ARBOR
Filed Feb. 12, 1968   2 Sheets-Sheet 1

INVENTOR
RUSSELL W. ANTHONY
BY *Whittemore, Hulbert & Belknap*
ATTORNEYS

United States Patent Office 3,492,914
Patented Feb. 3, 1970

3,492,914
EXPANDING ARBOR
Russell W. Anthony, 20499 Woodland,
Detroit, Mich. 48236
Filed Feb. 12, 1968, Ser. No. 704,887
Int. Cl. B23b 25/00; B23f 1/00
U.S. Cl. 90—1                                    12 Claims

ABSTRACT OF THE DISCLOSURE

An expanding arbor for a workpiece such as a gear in which the location of the workpiece in the machine is to be determined solely by radially outwardly movable keys engageable with a cylindrical opening to the workpiece.

Background of the invention

In expanding arbors for workpieces, such for example as a gear blank, it has been common practice to provide an expanding arbor which includes radially outwardly movable keys engageable with the inner cylindrical surface of an opening through the gear blank. In some cases locating means are provided engageable with one or both ends of the blank, and if these surfaces happen to be out of square with reference to the central opening through the work blank, it is possible for outward movement of the keys to produce a binding which will cause the gear blank to be improperly located.

It is to be understood that in workpieces of this type it is usual to have a predetermined surface used as the locating surface for locating the workpiece in the machine and the surface from which other surfaces are subsequently gauged.

Summary of the invention

In accordance with the present invention, a pair of heads are provided which are movable toward one another to locate and clamp the workpiece in predetermined position. One of these heads includes an arbor, having slots therein which receive radially outwardly movable keys. The inner edges of the keys are inclined and are associated with a relatively movable camming member having camming slots, the bottom surfaces of which are inclined camming surfaces.

A good example of such a machine is a vertical spindle hobbing machine, in which the work blank is initially positioned on an upwardly extending annular surface and the expanding arbor is then moved downwardly into the opening in the workpiece. As downward movement occurs, operating means on the heads engage, and also the inclined camming surfaces on the cam slots engage the keys. Either of these engagements may take place directly as the result of downward movement of the upper head, or they may take place under spring action as a result of the downward movement of the upper head releasing a part for movement by a spring. In either case, the end surfaces of the gear or workpiece are not engaged between locating elements on the heads, and therefore the workpiece is moved into an operating position and clamped solely by the engagement between the radially outwardly movable keys and the inner surface of the opening through the gear. Accordingly, all subsequent surfaces may be gauged with reference to the inner cylindrical surface through the workpiece.

As a further refinement it is possible to provide a tiltable temporary support for the gear as the expanding arbor is moved downwardly into it. With this arrangement, if the gear has an end surface which is out of square with reference to the opening through the gear blank, then as the arbors expand the temporary support tilts to permit the gear to be moved without appreciable resistance into accurately located position.

It is an object of the present invention to provide expanding arbor constructions in accordance with the foregoing.

Other objects and features of the invention will become apparent as the description proceeds, especially when taken in conjunction with the accompanying drawing, illustrating preferred embodiments of the invention.

Description of the preferred embodiments

Figure 1:
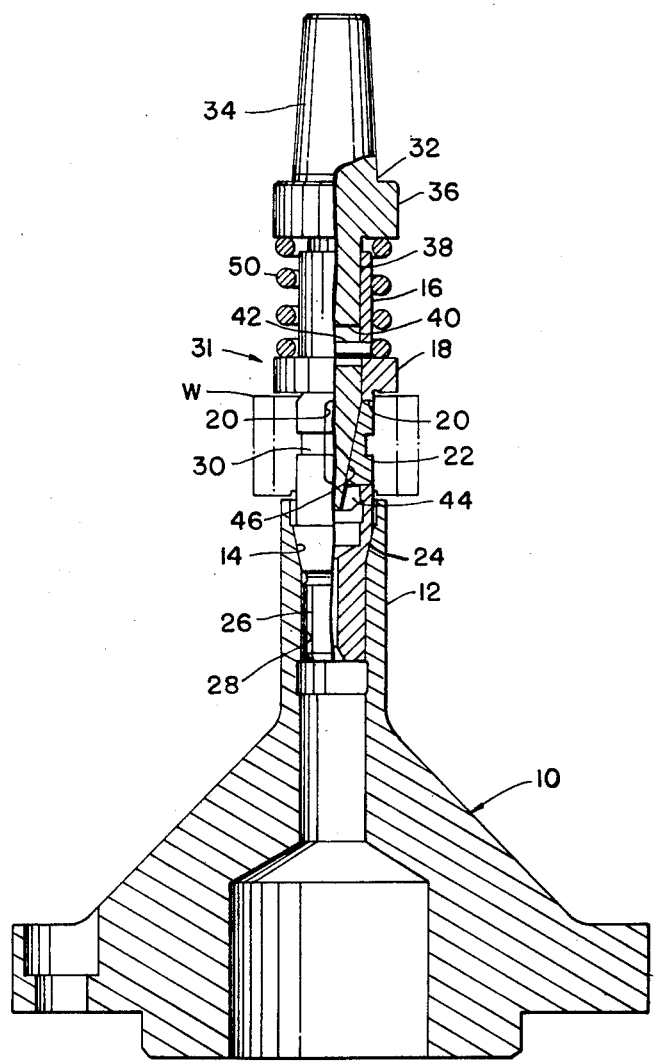
FIGURE 1 is a sectional view of an expanding arbor assembly showing a work gear supported thereon.

Referring now to FIGURE 1 there is shown an arbor assembly comprising a drive spindle 10 having an upwardly extending tubular portion 12 forming a cup provided with an internal conical driving surface 14. Associated with the spindle 10 is the expanding arbor comprising a sleeve 16 having an outwardly extending radial flange 18 formed thereon and provided with a multiplicity of elongated slots 20 for the reception of radially outwardly movable work locating and clamping keys 22. Below the slots 20 the sleeve 16 is provided with an external conical surface 24 which frictionally engages against the internal conical surface 14 in driving relation. Below the conical surface 24, sleeve 16 is provided with a cylindrical pilot portion 26 slidable in a cylindrical portion 28 of the spindle 10.

The keys 22 are provided with recesses 30 for the reception of a garter spring or the like which urges the keys inwardly into clearance with respect to the cylindrical opening in a workpiece except when cammed outwardly by means to be described.

Associated with the sleeve 16 is a plug assembly 31 comprising a camming member 32 which includes a tapered end portion 34 adapted to be engaged in a part of the machine, the camming member 32 and the spindle 10 being movable toward and away from each other in order to provide for driving interconnection therebetween and to further provide for locating and clamping of the workpiece.

The camming member 32 includes a radially outwardly extending flange 36 and a reduced cylindrical portion 38 over which the upper end of the sleeve 16 is longitudinally slidable. Camming member 32 is provided with a transversely elongated slot 40 which receives a pin 42, the ends of which are fixed openings in the sleeve 16. The pin 42 retains the camming member 32 and the sleeve 16 in assembled relation while still providing for relative longitudinal movement therebetween.

At its lower end, the camming member 32 is provided with a series of circumferentially spaced longitudinally extending slots 44, the bottom walls of which are inclined as indicated at 46 to engage the correspondingly inclined inner edges of the keys 22.

With the foregoing construction, it is assumed that the parts are in position to clamp the workpiece in assembled relation and to provide the proper driving relation between the spindle 10 and the camming member 32 and associated parts, then upon upward movement of the camming member 32 by the corresponding upward movement of an upper machine component, the upward movement of the camming member first moves the slots 44 with ther inclined camming surfaces 46 upwardly to release the keys 22 which are moved inwardly by means of the garter springs as previously described. The initial upward movement of the camming element 32 however does not result in upward movement of the sleeve 16 since a relatively strong compression spring 50 is provided between the flanges 18 and 36. Accordingly, upward movement of the camming member 32 continues until the pin 42 engages one end of the slot 40. Thereafter, further upward movement of the camming member moves the sleeve 38 upwardly and this movement is continued until all parts associated with the camming member, including the sleeve 16, are moved upwardly into clearance permitting removal of the workpiece W and replacement of a second workpiece on the upper annular surface provided at the upper end of the spindle 10. It is to be understood at this time that the workpiece is provided with an internal cylindrical opening which is to be the surface used to locate the workpiece and is to be the surface from which all further surfaces on the finished workpiece are gauged.

At this time the assembly connected to the camming member 32 is moved downwardly and downward movement continues until the conical surface 24 on the sleeve engages the conical surface 14 on the spindle 10. Thereafter, further movement of the camming member 32 results in compression of the spring 50 applying a downward force to the sleeve determined by the strength of the spring 50 and this movement is continued until the inclined surfaces 46 at the bottom of the slots 44 cam the keys 22 outwardly into engagement with the inner cylindrical surface of the workpiece. If the workpiece is not properly centered, or if due to an inaccuracy in an end surface it is canted or tilted before it is engaged by the keys, it will be observed that the workpiece is free for lateral movement and for whatever rocking movement is required to permit it to be located exactly coaxially and clamped into position by outward movement of the keys.

Figure 2:
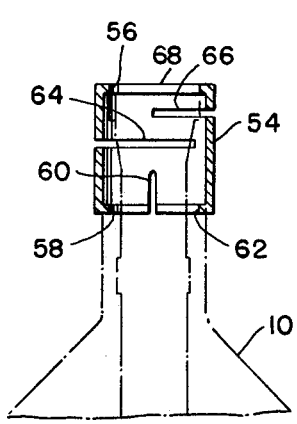
FIGURE 2 is a sectional view through a workpiece support designed for attachment to an arbor of the type of use shown in FIGURE 1.

Although the construction described in the foregoing permits movement of the workpiece into properly aligned position, even though one end surface is not exactly square with respect to the axis of the cylindrical opening, it is in some cases desirable to provide a yieldable support on the spindle 10 which definitely insures that the workpiece may rock or tilt as required to assume the proper operating position. Such a construction is illustrated in FIGURE 2 in which a relatively thin sheet metal tubular support 54 is provided having a short inwardly extending radial flange 56 at its upper end and a short inwardly extending radial flange 58 at its lower end. The lower end of the tubular element 56 is provided with one or more short axially extending slots 60 which permit expansion of the lower end in order to permit the inwardly extending radial flange 18 to be received in a suitably machined slot 62 provided in the spindle 10. The tubular member 54 is further provided with transversely extending slots 64 and 66 which permit the upper surface 68 of the member to rock as required to permit a work gear supported thereon to assume the proper operating position as it is engaged by radially outwardly expanding keys, such as the keys 22 shown in FIGURE 1.

Figures 3, 4:
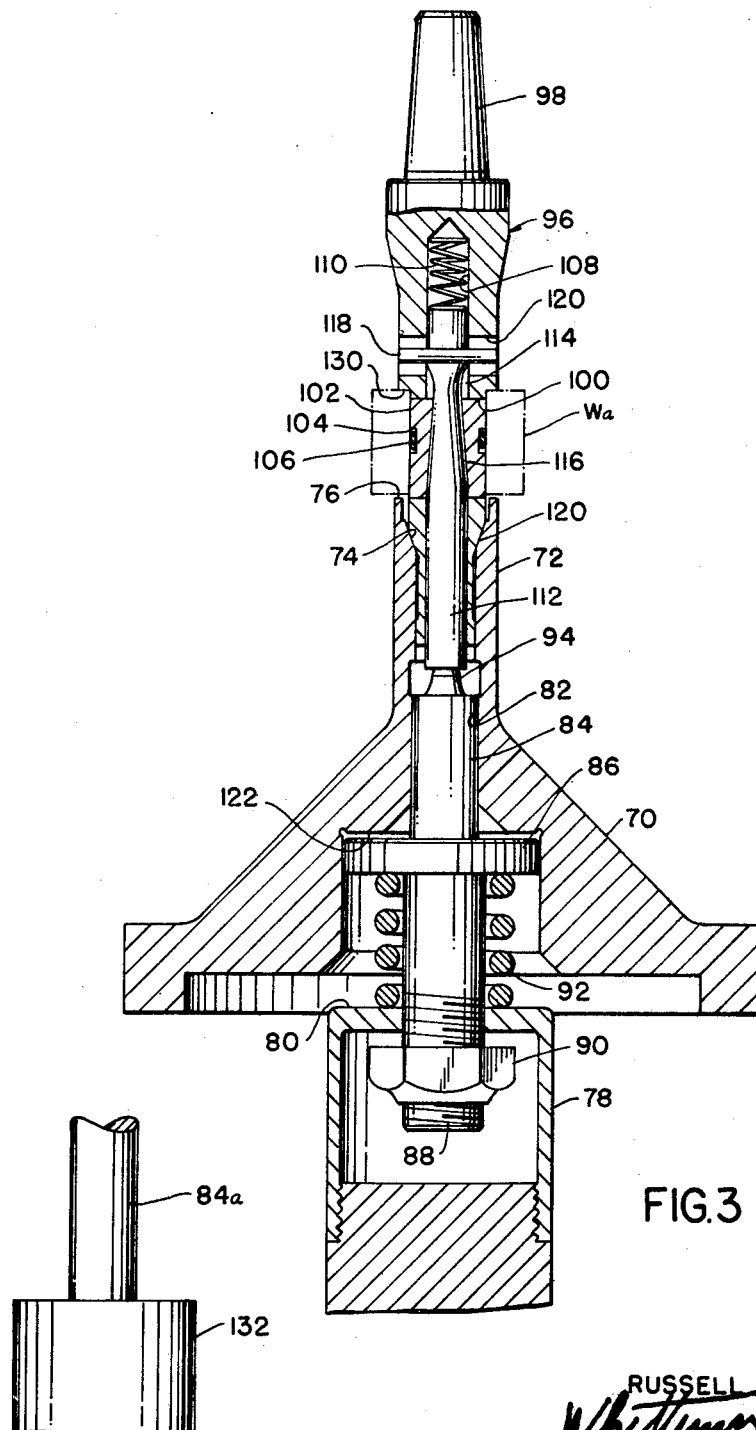
FIGURE 3 is a sectional view through an arbor assembly constituting a second embodiment of the present invention.
FIGURE 4 is a fragmentary view showing an alternative power source for the camming means.

Referring now to FIGURE 3 there is illustrated a somewhat different embodiment of the present invention in which a spindle 70 is provided with an upwardly extending tubular portion 72 forming an upwardly open cup having at the inner surface thereof a conical driving surface 74.

Associated with the spindle 70 and fixed against relative axial movement with respect thereto is a spring seat 78 having an annular abutment surface 80 at one end thereof. Vertically slidable in a cylindrical opening 82 provided axially of the spindle 70, is a wedge actuator having a cylindrical portion 84, an enlarged abutment flange 86, and a threaded lower end 88 extending into the member 78 and there engaged by a nut 90. Interposed between the abutment surface 80 and the flange 86 is a relatively strong compression spring 92 which determines the force applied to the means for camming the keys radially outwardly as will subsequently be described. The upper end of the actuating member comprises an abutment 94.

An upper assembly comprises the arbor 96 having an upper tapered end 98 engageable in a vertically movable machine part. The arbor 96 has a plurality of circumferentially spaced longitudinally extending slots 100 for the reception of work engaging keys 102, the inner edges of which are included for outward camming action. The keys 102 are provided with notches 104 for the reception of O-rings 106 which maintain the keys in assembly and provide a frictional support for a workpiece Wa.

The arbor 96 is provided with an elongated cylindrical recess 108 which at its upper end receives a relatively light compression spring 110, and which below the compression spring receives an elongated vertically movable cam pin 112. The pin 112 has longitudinally extending slots 114, the bottom walls of which are inclined as indicated at 116 to engage the correspondingly included inner edges of the keys 102. Cam pin 112 is retained in assembled relation by the provision of a cross pin 118 receivable in a transversely elongated slot 120 provided in the arbor 96.

With the parts illustrated in this figure, it will be observed that downward movement of the arbor 96 is positively terminated by engagement between a conical surface 120 on the arbor 96 and the conical surface 74 provided adjacent the upper end of the spindle 70. These conical surfaces engage in a frictional relationship such that if the spindle 70 is driven in rotation it serves to drive the arbor 96.

At the same time, the flange 86 has been displaced downwardly from the surface 122 provided at the interior of the spindle 70 so that the wedge actuator is urged upwardly by the force of the spring 92 to cam the keys 102 radially outwardly.

As previously indicated, the O-rings 106 constitute a frictional support for the workpiece Wa. In the embodiment illustrated in FIGURE 3, the workpiece may be caused, either manually or by suitable automatic loading equipment, to assume the position illustrated in the figure relative to the arbor 96. For example, the workpiece may be moved upwardly over the arbor 96 while it is stationary. Alternatively, the arbor may be moved downwardly through the workpiece while it is supported temporarily on a part of automatic loading equipment. In any case, the upper end of the workpiece, as shown, engages the shoulder 130 and is retained in this position by frictional engagement with the O-ring 106 which for this purpose is dimensioned normally to extend outwardly beyond the recesses in the outer edge of the keys 102. Accordingly, as the arbor 96 is moved downwardly, the lower end of the cam pin 112 engages the abutment 94 and upon further movement the force of the spring 92 is effective to cam the keys outwardly into tight engagement with the workpiece. Thereafter, engagement takes place between the conical surfaces 74 and 120 so as to transmit rotation between the spindle 70 and arbor 96.

In FIGURE 3 the axis of the workpiece W is indicated as vertical but the invention may equally well be applied to arrangements in which the workpiece is operated upon with its axis horizontal.

In any case, it is essential that camming movement of the cam pin 112 shall take place prior to engagement between the cam surfaces 74 and 120, since the frictional engagement between the outer surface of the keys 102 and the inner surface of the workpiece Wa is such as to preclude sliding movement of the workpiece over the keys after the spring 92 and cam surfaces 116 have urged the keys outwardly into solid engagement with the workpiece.

Referring to FIGURE 4 there is illustrated an alternative arrangement in which the shaft 84a, corresponding to the shaft 84 as seen in FIGURE 3, is connected to a piston located within a cylinder 132. In this case, fluid pressure is admitted to the cylinder 132 only after engagement has taken place between the conical surfaces 74 and 120.

While the embodiments of the invention have been illustrated as applied to expanding arbors whose axes extend vertically, it will of course be understood that the invention is equally applicable if the axis of the arbor is horizontal or otherwise disposed. The principal novelty in the present invention is a relationship which permits the workpiece to be located solely and entirely by the action of the expanding keys without the possibility of wedging or other interference with locating surfaces engageable with the ends of the workpiece.

The drawings and the foregoing specification constitute a description of the improved expanding arbor in such full, clear, concise and exact terms as to enable any person skilled in the art to practice the invention, the scope of which is indicated by the appended claims.

What I claim as my invention is:

1. Expanding arbor assembly adapted to be connected between spindles of a machine tool and comprising a cup having an integral drive surface therein and adapted to be connected to one spindle, a plug assembly adapted to be connected to the other spindle and having a portion movable axially in said cup and a drive surface engageable with the drive surface in said cup, said drive surfaces being effective to transmit rotary motion between said cup and plug assembly, said plug assembly comprising a tubular means having circumferentially spaced slots, keys in said slots having inclined cam surfaces at their inner edges, a camming member movable longitudinally in said tubular means, said drive surfaces and said cam surfaces being arranged for sequential action, and resilient means associated with said drive surfaces and cam surfaces to provide for resilient actuation of the first of said sequential actions to occur on approach between said cup and plug assembly, and means associated with the second of said actions operable to effect positive termination of relative approach between said cup and plug assembly, said plug assembly comprising an elongated member adapted for direct attachment to the other spindle and having key-camming surface portions, said tubular means comprising a sleeve slidable on said elongated member, and said resilient means comprising a spring interposed between said elongated member and said tubular means.

2. Structure as defined in claim 1 in which said drive surface of said plug assembly is provided on said sleeve.

3. Expanding arbor assembly adapted to be connected between spindles of a machine tool and comprising a cup having an integral drive surface therein and adapted to be connected to one spindle, a plug assembly adapted to be connected to the other spindle and having a portion movable axially in said cup and a drive surface engageable with the drive surface in said cup, said drive surfaces being effective to transmit rotary motion between said cup and plug assembly, said plug assembly comprising a tubular means having circumferentially spaced slots, keys in said slots having inclined cam surfaces at their inner edges, a camming member movable longitudinally in said tubular means, said drive surfaces and said cam surfaces being arranged for sequential action, and resilient means associated with said drive surfaces and cam surfaces to provide for resilient actuation of the first of said sequential actions to occur on approach between said cup and plug assembly, and means associated with the second of said actions operable to effect positive termination of relative approach between said cup and plug assembly, said tubular means comprising an end portion of an elongated body adapted for direct attachment to the other spindle, and said camming member being slidable longitudinally in said tubular means.

4. Structure as defined in claim 3 in which said resilient means includes means located in said cup and engageable with said camming member upon approach between said cup and plug assembly prior to engagement between said drive surfaces.

5. Expanding arbor assembly adapted to be connected between spindles of a machine tool and comprising a cup having rotary drive means therein and adapted to be connected to one spindle, a plug assembly adapted to be connected to the other spindle and comprising an elongated rigid member having a tubular portion provided with circumferentially spaced slots, keys in said slots, an elongated camming member movable longitudinally in said tubular portion, said rigid member having rotary drive means engageable with the rotary drive means in said cup, and resiliently urged abutment means in said cup engageable with said camming member on approach between said cup and plug assembly prior to engagement between said drive means.

6. Structure as defined in claim 5 in which said drive means comprise mating conical surfaces adapted on engagement to terminate approach between said cup and plug assembly.

7. Structure as defined in claim 6 comprising friction means on said rigid member engageable with a workpiece thereon, a shoulder on said rigid member adapted to be engaged by an end of said workpiece to position the workpiece in a position of clearance with respect to said cup.

8. Structure as defined in claim 7 in which said friction means comprises an O-ring surrounding said keys and normally projecting radially outwardly beyond said keys to engage the inner surface of an opening through the workpiece.

9. An expanding arbor assembly comprising first and second means adapted respectively to be connected to spindles of a machine tool which are movable toward and away from each other, said first means comprising radially movable keys, a camming member movable relative to said first means to cam said keys radially outwardly, rotary drive means on said first and second means operatively engageable on approach between said first and second means, abutment means acting directly between said first and second means to terminate approach therebetween and to prevent clamping engagement of said first and second means with the sides of an annular workpiece engaged internally by said keys, and resilient means associated with said camming member actuated on approach of said first and second means prior to engagement between said abutment means effective to move said camming member to urge said keys radially outwardly.

10. Structure as defined in claim 9 in which said rotary drive means and said abutment means are both provided by matching conical surfaces on said first and second means.

11. Structure as defined in claim 10, said first means comprising an elongated rigid member tubular at one end and having circumferentially spaced slots in which said keys are radially movable, the end portion of said member having one of said matching conical surfaces thereon.

12. Structure as defined in claim 11, said camming member having an end exposed for actuation at the end of said rigid member, and a spring pressed abutment at said second means engageable with the end of said camming member prior to engagement between said matching conical surfaces.

References Cited

UNITED STATES PATENTS

| | | | |
|---|---|---|---|
| 1,825,925 | 10/1931 | Shenk | 82—44 |
| 2,671,371 | 3/1954 | Pesqueira | 82—44 |
| 3,263,536 | 8/1966 | Anthony | 82—44 |

GIL WEIDENFELD, Primary Examiner

U.S. Cl. X.R.

82—44; 279—2